Nov. 27, 1962 W. J. ANTOSZEWSKI ETAL 3,065,549
APPARATUS FOR GAUGING GLASSWARE
Filed Aug. 18, 1960 2 Sheets-Sheet 1

INVENTORS
W. J. ANTOSZEWSKI
R. A. KURTZ
BY J. R. Nelson
J. F. Teigland
ATTORNEYS Nov. 27, 1962 W. J. ANTOSZEWSKI ETAL 3,065,549
APPARATUS FOR GAUGING GLASSWARE
Filed Aug. 18, 1960 2 Sheets-Sheet 2
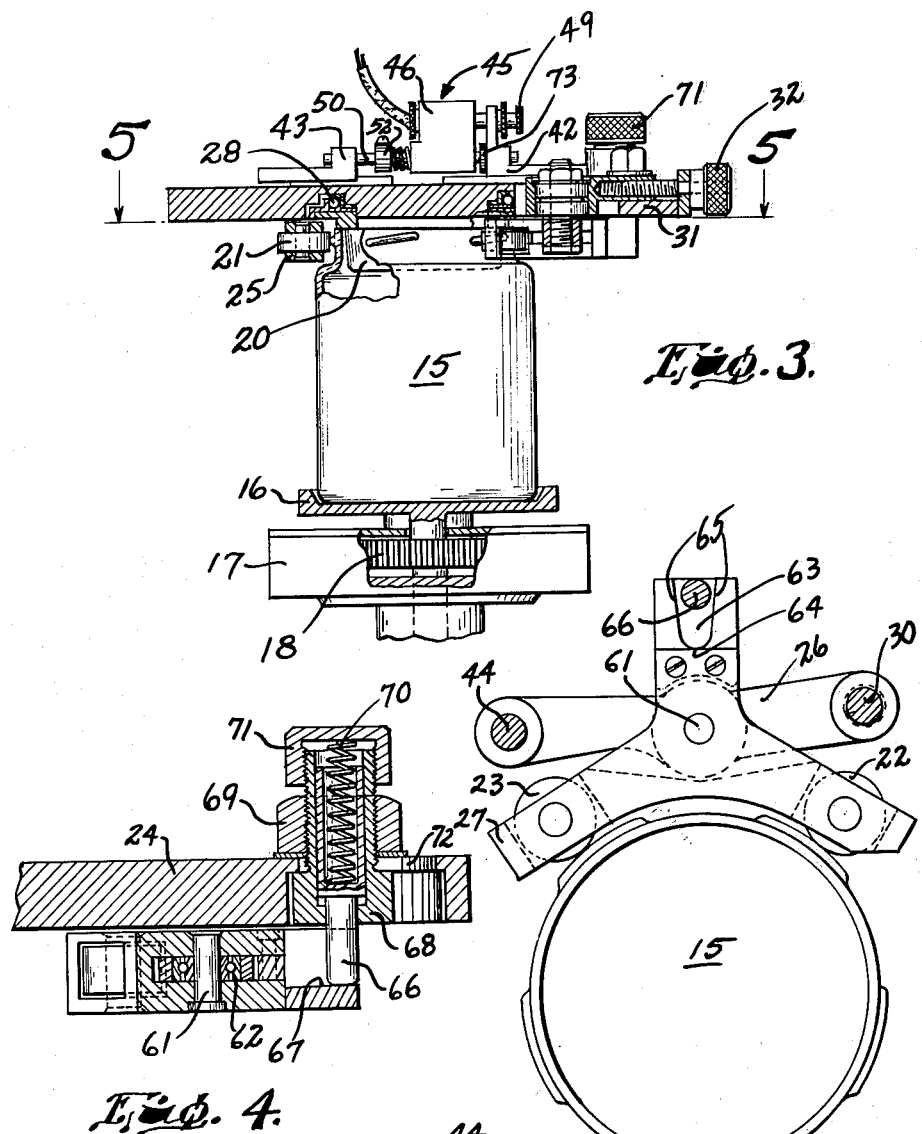
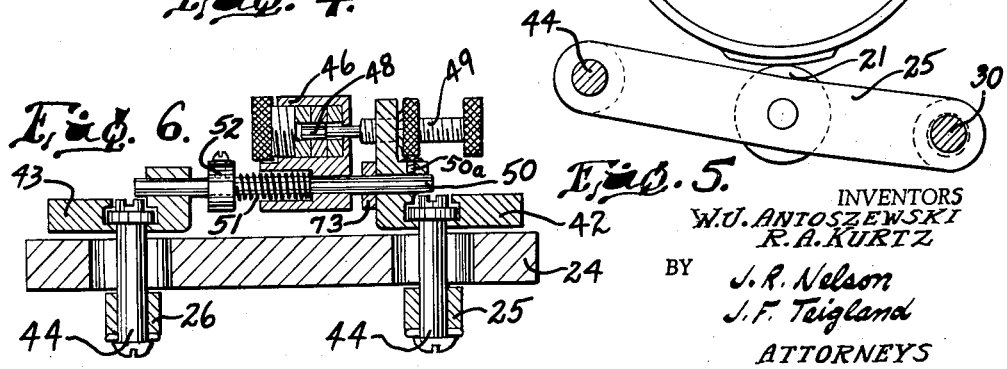
INVENTORS
W. J. ANTOSZEWSKI
R. A. KURTZ
BY
J. R. Nelson
J. F. Teigland
ATTORNEYS

United States Patent Office 3,065,549
Patented Nov. 27, 1962

3,065,549
APPARATUS FOR GAUGING GLASSWARE
Walter J. Antoszewski and Robert A. Kurtz, Toledo, Ohio, assignors to Owens-Illinois Glass Company, a corporation of Ohio
Filed Aug. 18, 1960, Ser. No. 50,538
8 Claims. (Cl. 33—178)

This invention relates generally to apparatus for gauging glassware, and more particularly to apparatus for dimensional gauging of the neck or threaded portion of hollow glassware such as bottles, jars, or other containers.

The present invention constitutes an improvement over gauging apparatus of the general type disclosed in W. J. Fedorchak et al., Inspection of Glassware by Radiation, U.S. Patent No. 2,868,061, and the application of W. J. Fedorchak et al. Apparatus for Gauging and Inspecting Glassware, filed April 5, 1955, Serial No. 499,394, now Patent No. 2,988,218 and owned by a common assignee.

The above-mentioned Fedorchak et al. inventions use two, diametrically opposed, gauging rolls in gauging the diametrical dimensions of hollow glassware. This type of apparatus is not capable of determining the diameter across the lugs or threaded portion of a container having an uneven number of spaced apart lugs, because the lugs are not diametrically opposed.

Accordingly, it is an object of our invention to provide high speed apparatus for precise gauging of diametrical dimensions of hollow glassware.

A further object of our invention is to provide apparatus for dimensionally gauging glassware wherein three gauging rolls are used to permit gauging the outside diameter across an uneven number of spaced apart lugs.

Another object of our invention is to provide apparatus for dimensionally gauging, with greater accuracy, hollow glassware using three gauging rolls, wherein two of the rollers are mounted on a self-aligning carrier.

The specific nature of this invention, as well as other objects and advantages thereof, will become apparent to those skilled in the art from the following detailed description taken in conjunction with the two sheets of drawings, on which, by way of example only, the preferred embodiment of this invention is illustrated.

In the drawings:

FIG. 3 is a vertical sectional view taken along the line 3—3 of FIG. 1, with the bottle being gauged partially broken away and one tie rod removed;

FIG. 4 is a vertical sectional view taken along the line 4—4 of FIG. 1;

FIG. 5 is a horizontal sectional view taken along the line 5—5 of FIG. 3, showing the gauging arms in gauging relationship about a five lug glass bottle; and FIG. 6 is a vertical sectional view taken along the line 6—6 of FIG. 1, showing the components of the differential transformer.

Figure 1:
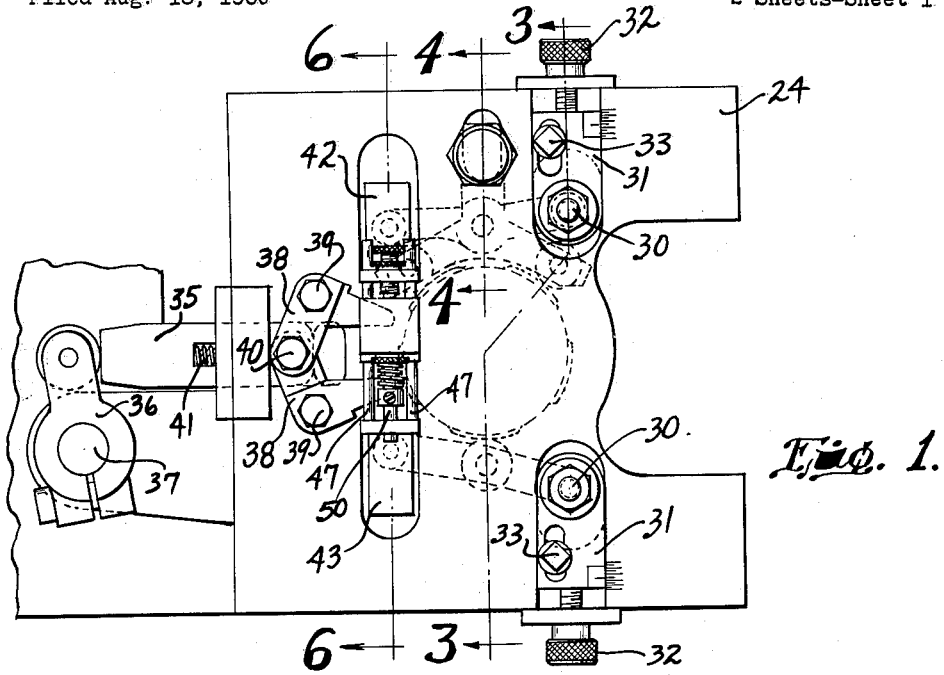
FIG. 1 is a top plan view of the gauging apparatus of our invention.
Figure 2:
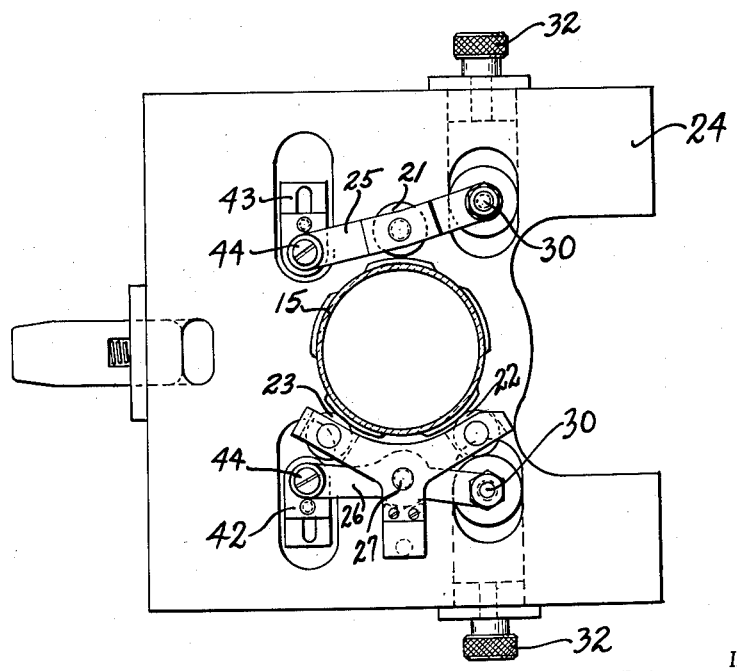
FIG. 2 is a bottom plan view of the gauging apparatus with a glass bottle shown in section.

Referring to FIG. 3, the apparatus shown is adapted for gauging hollow glass containers such as jars 15, and particularly for gauging the diameter of the jar neck or finish. During inspection the jar is supported on a pad 16 which is journaled in a supporting frame 17 and rotates about a vertical axis. The means for rotating the pad includes a gear train 18. The pad 16 and the frame 17 are movable vertically for lifting the jar into position for testing. The means for lifting, lowering, and rotating the pad 16 with the jar thereon may be the same as discussed, for example, in U.S. Patent 2,327,629 for Gauging Machinery, granted August 24, 1943. As the jar is lifted to the testing position, a centering cone 20 enters the mouth of the jar and holds it against lateral displacement. The jar is rotated about its axis during the gauging operation.

Referring to FIG. 5, the exterior diameter of the jar neck or finish is gauged by means of three gauging rolls 21, 22, and 23 mounted on a pair of gauging arms 25 and 26. One of the gauging rolls 21 is mounted directly on a gauging arm 25, and the other two gauging rolls 22 and 23 are mounted on opposing arms of a Y-shaped carrier 27 which is in turn pivotally mounted on the other gauging arm 26. These arms 25 and 26 are positioned on the lower side of a supporting plate 24, the arms being connected to adjustable pivots 30 which extend upwardly through openings in the plate 24 and are attached to an adjustable slide 31. The adjustable slides 31 are slidably and oppositely mounted in the supporting plate 24. They are adjustable, relative to each other, by means of an adjustment screw 32 and may be locked in place at a desired setting by a lock screw 33 which threadedly engages the supporting plate 24. The gauging rolls 21, 22, and 23 are yieldingly held in engagement with the work piece during the test while the work piece is rotated. The manner in which this is accomplished will be described presently.

Referring to FIG. 1, the means for opening or spreading the gauging arms 25 and 26 and releasing the work piece comprises a slide bar 35 mounted for lengthwise sliding movement on the plate 24. The bar 35 is moved in a forward direction for opening the gauging arms by means of a rocker arm 36 (FIG. 1) mounted on a vertical rocker shaft 37 which is periodically rocked in a conventional manner. The means for rocking the shaft 37 may be the same as discussed in the aforementioned patent, U.S. Patent No. 2,327,629. Operating connections between the slide bar 35 and the gauging arms comprise a pair of bell-crank levers 38 which rock about pivots 39. The bell cranks are connected to the slide bar by a pivot pin 40. The forward ends of the bell cranks extend between slidable members 42 and 43 (FIG. 1), said members being connected by pins 44 to the free ends of the gauging arms 25 and 26. A compression spring 41 is positioned within the slide to normally urge the slide bar backward to release the arms.

A means is provided which will enable transferring the relative mechanical movement between the gauging arms into an electrical signal. This means is actuated by its connection, through the slidable members 42 and 43, to the free ends of the gauging arms 25 and 26. Referring to FIGS. 1, 3, and 4, the aforementioned means, in its preferred form, comprises a differential transformer 45 which has its primary and secondary coils mounted in a shell 46 that is tied to the slidable member 43 by means of tie rods 47. The transformer core 48 is attached to the other slidable member 42, and is adapted to be longitudinally adjusted by means of an adjustment screw 49. A longitudinally extending slide rod 50 is attached to the slidable member 42, by means of a set screw 50a, and extends slidably through the shell 46 and the slidable member 43. A compression spring 51 encircles the slide rod 50 and rests against a portion of the shell 46 and a circular stop 52 mounted on the slide rod, to thereby urge the slidable members 42 and 43, and hence the gauging arms 25 and 26 together. In the foregoing arrangement, the gauging arms are operatively connected to the means for producing the electric signal, with the signal being variable in accordance with the relative movement between the arms, that is, the relative movement of the gauging arms will cause a proportional relative movement between the coils and core, and hence a voltage change between the primary and secondary coils. The signal produced thereby may be employed to operate mechanism for segregating gauged articles that are found to be defective as disclosed in the aforementioned copending application of Fedorchak et al.

Referring to FIGS. 4 and 5, the carrier 27 is freely, rotatably mounted on one of the gauging arms 26 by means of a pivot pin 61 which is journaled in a bearing 62. At the outer end of the carrier is a slot 63 which is semi-circular at its innermost end 64 and has outwardly diverging sides 65 to form roughly a U-shaped slot. A locating pin 66, which is mounted on the supporting plate 24, frictionally engages the bottom surface 67 of the slot 63. The pin 66 is mounted in a holder 68 which is secured to the supporting plate by a nut and washer 69 and is urged against the surface 67 by a compression spring 70. The spring 70 is mounted in the pin 66 and is held in place by a cap 71, which is threadedly secured to the holder. The holder is held in an elongated hole 72 formed in the supporting plate to permit adjustment of the locating pin 66. The bottom surface 67 of the slot is given a taper so that the frictional force between the pin and surface will increase as the pin rides to the outermost end of the slot 63, as the carrier moves to a gauging position.

In operation, the jar 15 is placed on a pad 16 while the latter is in its lower position. The pad is then raised, bringing the jar to position for testing with the centering cone 20 protruding into the jar. While in this position the jar is rotated. The rocker arm 36 is then rotated to release the slidable members 42 and 43 which allow the gauging rolls 21, 22, and 23 to yieldingly bear against the perimeter of the work piece. The compression spring 41 urges the gauging arms into the aforementioned gauging position. When a continuous surface is being measured, changes in the diameter of the work piece will cause relative movement between the gauging arms 25 and 26, and hence relative movement of the transformer elements which are operatively connected thereto. Such relative movement of the transformer elements produces a voltage change between the primary and secondary coils. This voltage change, or electrical signal, may be amplified and used for indicating work pieces which are out of round or the diameter of which is over or under permissible limits. The signal from the transformer may be used for effecting the operation of a signal or other desired conventional mechanisms for rejecting work pieces which do not conform to a predetermined standard. It is to be understood, of course, that other means may be used to provide an electrical signal which is proportional to the relative movement between the free ends of the gauging arms. For example, it is possible to use a variable resistor.

Where the work piece or jar has an uneven number of spaced apart lugs, as illustrated in FIG. 5, a spacer 73 may be mounted on the slide rods 47 to restrict the inward movement of the gauging arms 25 and 26 and prevent the gauging rolls from bouncing in and out of the spaces formed between the lugs. Such a restriction will preclude gauging for undersized containers, unless the apparatus to which the signal is fed will respond only to voltage changes within a certain range, that range being defined by the voltages for the maximum and minimum allowable diameters. As a practical matter, this is relatively unimportant since most defective jars are oversized. It is to be noted that with three rollers which are spaced apart so as to be aligned with three separate lugs, it is possible to check jars having spaced apart lugs for over maximum diameters.

When the gauging arms are held apart by the slide bar 35 and its operative connections in a non-gauging position, the friction pin 66 is moved against the innermost portion of the slot 63, thereby centering the carrier 27 and preventing it from rocking into the path of an upwardly moving jar. This eliminates the need for excessive clearance between the rolls and upwardly moving jars. When the gauging arms 25 and 26 are in gauging position, the locating pin 66 resides in the widest portion of the slot, thereby allowing the carrier a predetermined amount of rotational movement to align itself with a jar which is not perfectly centered about the centering cone 20. This permits a greater amount of clearance between the centering cone and the jar, and hence allows higher operating speeds and more accurate readings. Also, when the carrier is in the gauging position, the pin 66 bears more heavily against the tapered bottom surface 65 of the slot and dampens vibrations which would otherwise occur at higher operating speeds and would tend to give false readings.

It will, of course, be understood that various details of construction may be modified through a wide range without departing from the principles of this invention, and it is not, therefore, the purpose to limit the patent granted hereon otherwise than necessitated by the scope of the appended claims.

We claim:

1. Apparatus for gauging the diametrical dimensions of a work piece rotating about its central axis, comprising a pair of gauging arms pivotally mounted at one end and disposed about said rotating work piece, (1) means for yieldingly urging said arms toward said work piece, one of said arms having a gauging roll rotatably mounted thereon, the other of said arms having a carrier mounted pivotally thereon, said carrier having two gauging rolls rotatably mounted thereon, said rolls being arranged in spaced relationship to lie in tangential contact with the perimeter of the work piece when the arms are urged inwardly, (2) means for converting mechanical movement into an electrical signal, (3) means operatively connecting the free ends of said arms to said second-mentioned means, whereby relative movement between said arms in response to diametrical changes in said work piece will produce an electrical gauging signal.

2. Apparatus as defined in claim 1, plus means for spreading said gauging arms to allow admittance or removal of a work piece.

3. Apparatus as defined in claim 1, wherein said second-mentioned means thereof comprises a differential transformer.

4. Apparatus for gauging the diametrical dimensions of glassware, comprising a pair of oppositely disposed, pivotally mounted gauging arms, means for yieldingly urging said arms toward each other, one of said arms having a gauging roll rotatably mounted thereon, the other of said arms having a pivotally mounted carrier, said carrier having a pair of gauging rolls rotatably mounted thereon, said gauging rolls being spaced apart and arranged to lie in tangential contact with the perimeter of said glassware when said glassware is between said arms and said arms are yieldably urged toward each other thereby defining their gauging position, means for converting mechanical movement into an electrical signal, means operatively connecting the free ends of said arms to said converting means, whereby relative movement between said arms caused by diametrical differences in the perimeter of said glassware will produce an electrical signal proportional to said movement, and means for spreading said arms to a non-gauging position.

5. Apparatus as defined in claim 4, wherein said second-mentioned means comprises a differential transformer.

6. Apparatus as defined in claim 4, wherein the pivots for said arms are oppositely disposed and adjustable relative to each other.

7. Apparatus as defined in claim 4, plus a slot on said carrier and a locating pin receivable within said slot, said slot having diverging side walls arranged to positively locate said carrier with respect to said pin when said carrier is withdrawn to a non-gauging position and allow said carrier a limited amount of pivotal movement when said carrier is in gauging position.

8. Apparatus as defined in claim 7, wherein said slot has a tapered bottom surface and said locating pin is spring-loaded, said surface and pin being arranged to increase the friction force between the two as the carrier is moved from non-gauging to gauging position.

References Cited in the file of this patent

UNITED STATES PATENTS

| | | |
|---|---|---|
| 2,392,010 | Stevens | Jan. 1, 1946 |
| 2,689,409 | Fry et al. | Sept. 21, 1954 |
| 2,842,862 | Johnson | July 15, 1958 |

FOREIGN PATENTS

| | | |
|---|---|---|
| 451,607 | Great Britain | Aug. 10, 1936 |
| 843,903 | Germany | July 14, 1952 |

OTHER REFERENCES

American Machinist, Nov. 17, 1949, p. 95. (Copy in 33—178A.)